(12) United States Patent
Powell et al.

(10) Patent No.: US 9,089,806 B2
(45) Date of Patent: Jul. 28, 2015

(54) EXHAUST GAS DIVERTER AND COLLECTION SYSTEM FOR OCEAN GOING VESSELS

(71) Applicants: John Powell, Santa Clarita, CA (US); Robert Sharp, Camarillo, CA (US)

(72) Inventors: John Powell, Santa Clarita, CA (US); Robert Sharp, Camarillo, CA (US)

(73) Assignee: ADVANCED CLEANUP TECHNOLOGIES, INC., Carson, CA (US)

( * ) Notice: Subject to any disclaimer, the term of this patent is extended or adjusted under 35 U.S.C. 154(b) by 50 days.

(21) Appl. No.: 13/632,960

(22) Filed: Oct. 1, 2012

(65) Prior Publication Data

US 2014/0090379 A1    Apr. 3, 2014

(51) Int. Cl.
  *F01B 31/16*  (2006.01)
  *B01D 46/42*  (2006.01)
  *B63H 21/34*  (2006.01)

(52) U.S. Cl.
  CPC ............... *B01D 46/42* (2013.01); *B63H 21/34* (2013.01)

(58) Field of Classification Search
  CPC .............................. B63H 21/32; B63H 21/34
  USPC ...................... 440/89 R, 89 A, 89 H
  See application file for complete search history.

(56) References Cited

U.S. PATENT DOCUMENTS

| | | | |
|---|---|---|---|
| 6,022,389 A * | 2/2000 | Vross et al. | 55/315.1 |
| 6,025,920 A * | 2/2000 | Dec | 356/438 |
| 7,258,710 B2 | 8/2007 | Caro et al. | |
| 7,306,500 B1 * | 12/2007 | Spangler et al. | 440/89 R |
| 7,930,931 B2 * | 4/2011 | Stedman | 73/114.71 |
| 8,075,651 B2 * | 12/2011 | Caro et al. | 55/385.1 |
| 8,266,952 B2 * | 9/2012 | Stedman | 73/114.71 |
| 8,347,701 B2 * | 1/2013 | Stedman | 73/114.71 |
| 8,429,957 B2 * | 4/2013 | Stedman | 73/114.71 |
| 2005/0244318 A1 * | 11/2005 | Caro et al. | 423/212 |
| 2006/0053775 A1 * | 3/2006 | Powell et al. | 60/286 |
| 2006/0213197 A1 * | 9/2006 | Caro et al. | 60/685 |
| 2007/0209544 A1 * | 9/2007 | Caro et al. | 105/26.05 |
| 2007/0209545 A1 * | 9/2007 | Caro et al. | 105/26.05 |
| 2009/0197489 A1 * | 8/2009 | Caro et al. | 440/89 R |
| 2010/0058747 A1 * | 3/2010 | Rodriguez et al. | 60/299 |
| 2011/0023490 A1 * | 2/2011 | Henriksson et al. | 60/685 |
| 2011/0023765 A1 * | 2/2011 | Henriksson et al. | 114/211 |
| 2011/0265449 A1 * | 11/2011 | Powell et al. | 60/272 |

OTHER PUBLICATIONS

"Plenum." Webster's II New College Dictionary, 1999.*

* cited by examiner

*Primary Examiner* — Thomas Denion
*Assistant Examiner* — Mickey France
(74) *Attorney, Agent, or Firm* — Kenneth L. Green; Averill & Green

(57) ABSTRACT

An exhaust gas collection system for capturing exhaust gas emitted by auxiliary engines, auxiliary boilers and other sources on an Ocean Going Vessel (OGV) while at berth or anchor, so that these gases may be carried to an emissions treatment system for removal of air pollutants and greenhouse gases. The exhaust gas collection system includes a diverter to redirect exhaust gas normally carried to the OGV's stack for release to the atmosphere, to an emissions treatment system. The emissions treatment system may be land-based, water-based, or on the OGV. When the emissions treatment system is land-based or water-based, the exhaust gas is carried to a connection location that accessible by a ducting system to carry the exhaust gas to the emissions treatment system. The exhaust gas collection system preferably includes parallel-flow ducts and a manifold to combine the parallel-flows into a single duct for more convenient routing through the vessel.

20 Claims, 3 Drawing Sheets

EXHAUST GAS DIVERTER AND COLLECTION SYSTEM FOR OCEAN GOING VESSELS

BACKGROUND OF THE INVENTION

The present invention relates to control of emissions from Ocean Going Vessels (OGVs) at berth or anchored in port and in particular to the collection of exhaust gases inside the OGVs to allow subsequent processing.

OGVs at berth or anchored in port are a significant source of air pollution from the exhaust gases of their auxiliary power sources. The OGVs have auxiliary diesel engines and auxiliary boilers which normally remain in operation while the OGV is at berth or anchored. The auxiliary engines drive generators which provide power for ballast and other pumps, onboard motors, shipboard lighting and air conditioning, communications equipment, and other housekeeping functions. The auxiliary boilers are used to keep the bunker fuel used to feed the main engines warm. If allowed to cool, this fuel becomes so viscous it is difficult or impossible to pump. Heat from the boilers is also used for other shipboard functions.

The boilers and auxiliary engines are a source of nitrogen dioxide (NOx), sulfur dioxide ($SO_x$), particulate matter (PM), and volatile organic compounds (VOCs), all of which are air pollutants. Left untreated, the OGVs are one of the most significant sources of air pollution in the vicinity of ports throughout the world.

The OGVs discharge the exhaust from the auxiliary engines and auxiliary boilers through exhaust pipes clustered within an exhaust stack which runs from the engine room up through the OGV's decks and continues some distance above the top deck. U.S. Pat. No. 7,258,710 for Maritime Emissions Control System, assigned to the assignee of the present invention, describes a maritime emissions control system which may be transported by barge or vessel to an OGV near or within a harbor. The maritime emissions control system uses a bonnet (or umbrella-like device) which is lifted up above the top of the OGV exhaust stack and then lowered over the entire exhaust stack of the OGV and sealing around the exhaust stack perimeter, thereby capturing exhaust otherwise released to the environment. The '710 patent further discloses processing the exhaust flow from the OGV to reduce emissions.

The top of the stack is usually the highest part (other than antennas) of the OGV. A tall crane is therefore required to reach the top of the stack, which adds expense, and requires a skilled and certified crane operator.

Another issue with connecting to the top of the stack is that the connection operation is very difficult to carry out by personnel locally at the stack because of dangers of hot exhaust and pipes, toxic fumes, and limited accessibility at best. Therefore, connection to the stack requires remote control from a distance, using either line of site from another part of the vessel or using video cameras. This remote operation adds cost and complexity to the operation.

Another issue is higher winds at the top of the stacks which makes the connection more difficult. A device hanging from a crane, or other placement device, many tens of feet above ground or sea level, and often over 100 feet above ground or sea level, is frequently subjected to wind forces which cause the attachment system to sway with relatively large excursions, creating a danger of hitting and damaging antennas or other nearby OGV structures. This movement also makes alignment and attachment to the stack difficult if not impossible in windy conditions.

Another drawback is that the exhaust gas must be ducted all the way to the ground, which adds cost and this ducting has to be supported by some means as it makes its way to ground level where the processing equipment is located. This additional duct length adds cost in material for the duct itself and operating cost due to increased pressure drop.

U.S. patent application Ser. No. 12/772,520 filed May 3, 2010 by the present applicant describes a system including a manifold and individual ducts for connecting to the OGVs exhaust pipes for capturing the OGV exhaust. While the system of the '520 application overcomes some of the difficulties of the '710 patent, there remains a need to connect to the original exhaust pipes which is not always convenient, must be performed at a very high point on the OGV, and requires lengthy ducting. The '710 patent and the '520 application are herein incorporated in their entirety by reference.

BRIEF SUMMARY OF THE INVENTION

The present invention addresses the above and other needs by providing an exhaust gas collection system which collects the exhaust gas emitted by auxiliary engines, auxiliary boilers and other sources on an Ocean Going Vessel (OGV) while at berth or at anchor, so that these gases may be carried to an emissions treatment system for removal of air pollutants and greenhouse gases. The exhaust gas collection system includes a diverter to redirect the exhaust gas normally carried by exhaust pipes to the OGV's stack for release to the atmosphere, to an exhaust gas treatment system. The emissions treatment system may be land-based, water-based, or on the OGV. When the emissions treatment system is land-based or water-based, the exhaust gas is carried to a connection location that is accessible by a ducting system to carry the exhaust gas to the emissions treatment system. The exhaust gas collection system preferably includes parallel-flow ducts and a manifold to combine the parallel-flows into a single duct for more convenient routing through the vessel.

In accordance with one aspect of the invention, there are provided couplings, for example, "T" pipe fittings, to connect each of the internal exhaust ducts to the external connection system. The couplings may take on any of several forms, employ any of several means of securing and coupling to the ducts.

In accordance with another aspect of the invention, a commercially available jib-type small crane or arm may be used to position the coupling for connection to the internal exhaust ducts during initial installation. Alternatively, connection may be conducted by a technician who has direct access to the location where the exhaust duct(s) exit the vessel, either from onboard the vessel or from the surface.

In accordance with another aspect of the invention, in the instance where exhaust is produced by more than one engine, there is provided a manifold to receive exhaust gas from multiple ducts and deliver the combined exhaust gas through a single duct to the connection interface.

In accordance with still another aspect of the invention, a standard pressure relief valve is provided to protect the OGV's engines, boilers, and the like in the event of excessive back pressure due to blockage of the duct or malfunction of the treatment system. The pressure relief valve diverts the exhaust gas to the atmosphere outside the OGV through the existing OGV exhaust pipe, or through an added exhaust pipe.

In accordance with yet another aspect of the invention, there are provided automatically actuated valves and/or covers, couplings and seals for each of the duct(s). These automatically open (or close) the normal vertical exhaust pipe while simultaneously closing (or opening) the new pipes leading to the emissions treatment system.

In accordance with another aspect of the invention, each coupling device may be utilized to perform several functions, including alignment of each flexible duct with the corresponding exhaust pipe, facilitate flexible duct attachment to, or insertion over or inside, the exhaust pipe, and seal or close off the interface between each flexible duct with the corresponding exhaust pipe.

In accordance with still another aspect of the invention, there is provided a positioning system. The positioning system may be a pivoting arm, support structure, or a crane.

BRIEF DESCRIPTION OF THE SEVERAL VIEWS OF THE DRAWING

The above and other aspects, features and advantages of the present invention will be more apparent from the following more particular description thereof, presented in conjunction with the following drawings wherein.

Corresponding reference characters indicate corresponding components throughout the several views of the drawings.

DETAILED DESCRIPTION OF THE INVENTION

The following description is of the best mode presently contemplated for carrying out the invention. This description is not to be taken in a limiting sense, but is made merely for the purpose of describing one or more preferred embodiments of the invention. The scope of the invention should be determined with reference to the claims.

In the following detailed description, the term stack refers to the large structure protruding from the upper part of an Ocean Going Vessel (OGV) and from which exhaust gas may be observed to exit the OGV. An alternative term for stack, used by some in the marine field, is funnel. The stack contains or encompasses several individual OGV exhaust pipes. Each of the OGV exhaust pipes connects to one source of exhaust gas such as one auxiliary engine or one auxiliary boiler or an onboard incinerator. The terms vessel and OGV mean one and the same, namely an OGV used to transport cargo or people, and the terms are used interchangeably in the marine field. The term hotelling means the OGV is at berth or at anchor with the main engines off. During hotelling, ongoing shipboard activities continue to require electrical, heat, and steam power, thus creating exhaust.

Figure 1:
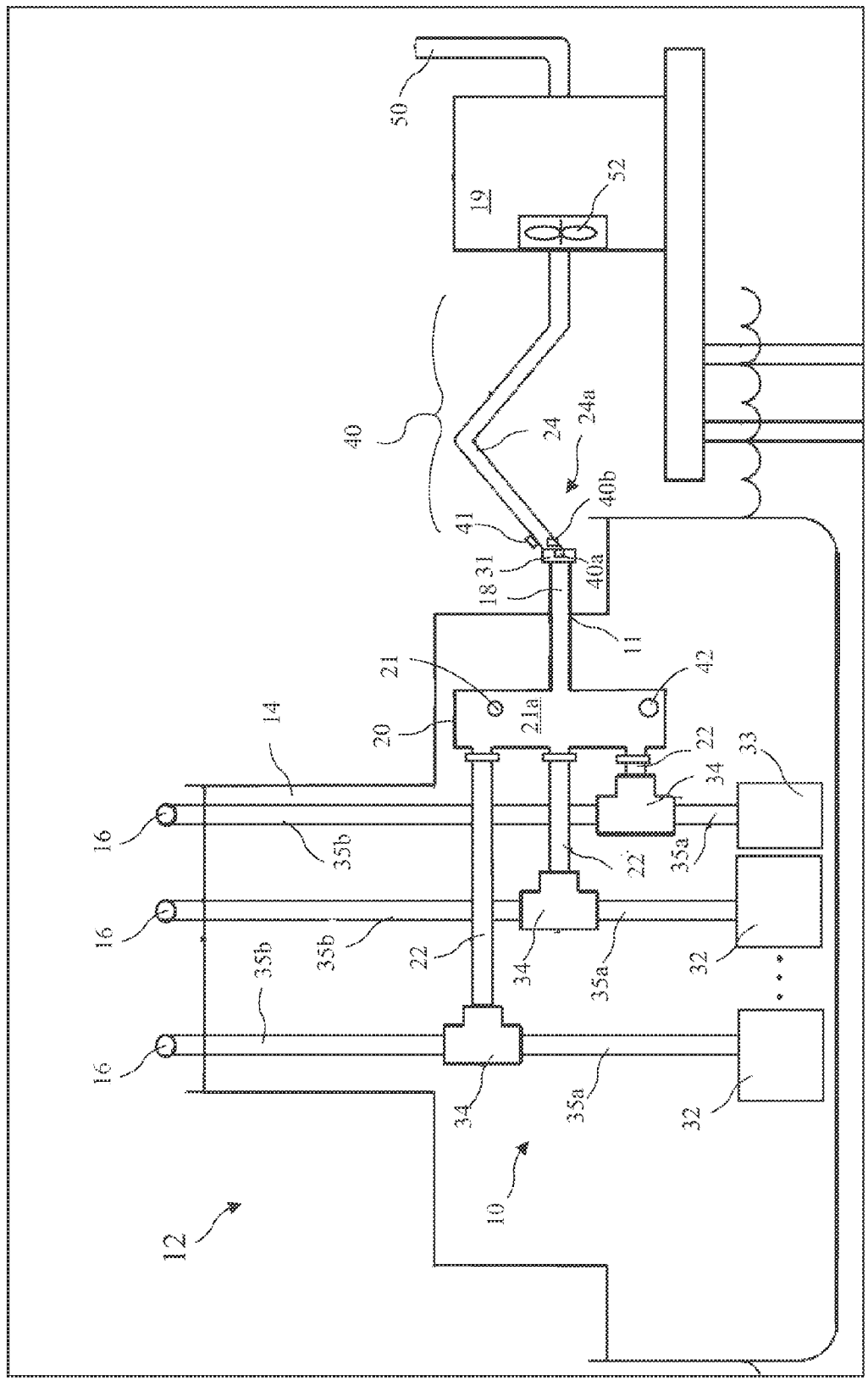
FIG. 1 shows an exhaust collection system according to the present invention installed into an Ocean Going Vessel (OGV).

An exhaust collection system 10 according to the present invention is shown in FIG. 1 attached to an Ocean Going Vessel (OGV) 12. The exhaust collection system 10 collects OGV 12 exhaust gases otherwise released to the atmosphere from OGV 12 exhaust pipes 16 inside the OGV stack 14 during hoteling. The collected exhaust gases are carried through a family of parallel-flow ducts (or exhaust pipes) 22 to a manifold 20, and from the manifold 20 through a main duct (or hose) 18 to a location outside the OGV 12. When hoteling, the main duct 18 is connected through a connection port 31 to a capture system 40 which delivers the exhaust gas to an emissions treatment system 19 where air pollutants and greenhouse gasses are removed.

Examples of suitable emissions treatment systems 19 are described in U.S. Pat. No. 7,258,710 for "Maritime Emissions Control System", U.S. Pat. No. 7,275,366 for "High Thermal Efficiency Selective Catalytic Reduction (SCR) System", and U.S. patent application Ser. No. 11/092,477 for "Air Pollution Control System for Ocean-going Vessels". The '710 patent, '366 patent, and '477 application are herein incorporated by reference.

Commercial OGVs 12 such as container vessels, tankers, passenger, RoRo, and bulk carriers have several OGV exhaust pipes 16. Each of the OGV exhaust pipes 16 receives exhaust gas from one or more source of exhaust gas such as an auxiliary diesel engine 32, auxiliary boiler 33, or an incinerator. The OGV 12 typically has three or more auxiliary engines 32 of which one or two are typically operating while the OGV 12 is at berth, and one or more auxiliary boilers 33 of which one is normally operating either continuously or intermittently at berth, except in the case of tankers offloading cargo with onboard steam driven pumps, in which case two or three auxiliary boilers 33 may be operating. There are also minor sources of gaseous discharge from OGV 12 housekeeping activities such as the galley or incinerator, each of which has an exhaust pipe, but these are generally not a significant source of air pollution and the incinerator is not usually used in port.

The OGV 12 main engine exhaust pipe(s) are not addressed by the present invention because the main engines are not operating during the time the OGV 12 is at berth or at anchor except during preparation for departure. The OGV exhaust pipes 16 addressed by the invention, of which there are typically five or more from the auxiliary engines, auxiliary boilers, and other sources, are generally routed through the OGV stack 14 and exit the OGV 12 through passages in a floor within the stack 14, which floor is usually located a few feet below the top of the stack 14. The pipes 16 extend vertically above the floor and above the peak of the exhaust stack 14.

When the OGV 12 is not connected to the emissions treatment system 19, the exhaust gas follows the path from the auxiliary engine(s) 32 and/or auxiliary boiler(s) 33, through primary exhaust pipes 35a, through diverter 34, through secondary exhaust pipes 35b, through the floor in the stack 14, and out the exhaust pipe 16 to the atmosphere untreated. When the OGV 12 is connected to the emissions treatment system 19, the OGV exhaust gas follows the path from the auxiliary engine(s) 32 and/or auxiliary boiler(s) 33, through primary exhaust pipes 35a, through diverter 34, through the parallel-flow flexible ducts 22, into the manifold 20, and through the main duct 18 to an accessible location 11. The main duct connects to the capture system 40 at the connection port 31, and the capture system 40 carries the OGV exhaust to the treatment system 19.

The manifold 20 combines the exhaust flow from the auxiliary engine(s) and/or auxiliary boiler(s) 33 into a single flow, which has the advantage of only a single main duct 18 is required, which simplifies routing to the location 11. The exhaust collection system 10 may alternatively route the parallel-flow ducts 22 to the connection port 31 for a family of parallel connections.

Construction of the exhaust collection system 10 and connection port 31 requires addressing several issues. Any connection must accommodate six degrees of freedom motion of the OGV 12. The motions of the OGV 12 include translating in three directions and rotating about three axes. Additionally, the slow draft changes due to tide and cargo loading or unloading can lift or lower the OGV 12 as much as 40 feet vertically.

Another consideration is that the connection to location 31 may be handled manually, or with some sort of assist such as a crane. Once connected, the exhaust gas travels through duct(s) 24 which may be either flexible or rigid duct, to the treatment system 19. Once the exhaust gas is processed by the treatment system 19, the cleaned exhaust exits through pipe 50 to the atmosphere.

The exhaust collection system 10 also includes positioning apparatus for positioning the connection duct(s) 24 in the vicinity of the connection location 31. The positioning apparatus may include sensors 40a and 40b on the connection port 31 and a connecting end 24a of the connection ducts 24 respectively and used to position the connector 31 into alignment with pipe 18, for determining the location of the connection location 31 and moving the connection duct 24 to that location, securing an adequate seal, and providing an attachment to the connection location 31. The locating, positioning, and attaching activity may be by direct visual means and a joy stick, by a valve block, or other manual controller, by video and or infrared and or acoustic and or laser or similar means with a remote human operator, or it may be partially or fully automatic with remote human oversight and override capability, or by a combination of these methods.

The exhaust collection system 10 may include optical and infrared cameras 41 which portray on a video monitor the position of the interface connector 31 relative to the duct 24, which can be used by the operator to guide the connection process. The sensors 41 are used for determining the location of the connection location 31 and moving the connection duct 24 to that location, securing an adequate seal, and providing an attachment to the connection location 31. The locating, positioning, and attaching activity may be by direct visual means and a joy stick, by a valve block, or other manual controller, by video and or infrared, as described above, and or acoustic and or laser or similar means with a remote human operator, or it may be partially or fully automatic with remote human oversight and override capability, or by a combination of these methods.

The exhaust collection system 10 also includes pressure and flow maintenance apparatus to establish and maintain flow and control pressure in duct as it is attached to an OGV as well as during subsequent operation so as to preclude significant alteration of preexisting exhaust flows, back pressure, or boiler operation. The pressure and flow maintenance apparatus may be a commercially available pressure sensor 21 located either in manifold 20 or at or near the connection port 31. The signal from this pressure sensor is used to control the variable speed fan 52 in the treatment system 19, continuously adjusting this speed to maintain a slight vacuum in the exhaust gas collection system, thereby avoiding back pressure on the auxiliary engines and auxiliary boilers. The interior 20a of the manifold 20 provides a plenum providing mechanical compliance to smooth out pressure excursions which could otherwise occur when flows from the OGV exhaust pipes change.

A pressure relief valve(s) 42 resides on either the primary exhaust pipes 35a, the parallel flow ducts 22, the manifold 20, or the main duct 18. If high pressure is created in the exhaust collection system 10, the relief valve opens to prevent damage. The relief valve may be ducted to the interior of the OGV 12, to the exterior of the OGV 12, or to the exhaust pipes 35b to carry the exhaust to the stack and to the exterior of the OGV, and also provides relief in under pressure situations allowing ambient air to enter the exhaust collection system 10 to prevent damage to the exhaust collection system 10.

Figure 2:
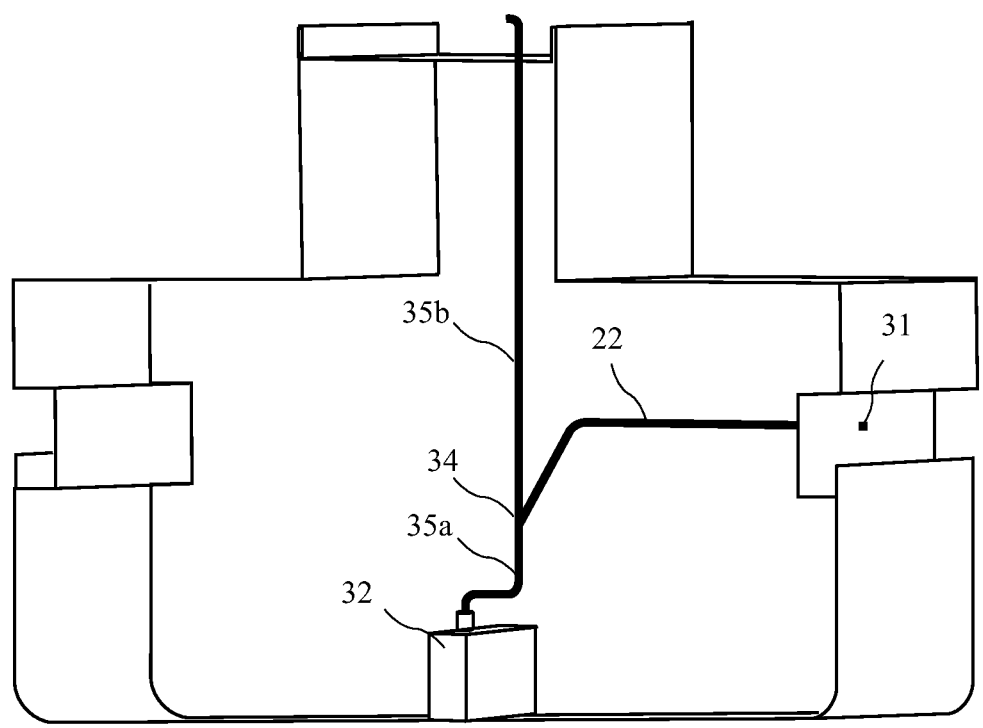
FIG. 2 shows an example of the diverter connected between the exhaust pipes to divert an exhaust flow to the parallel-flow flexible ducts and on to the connection port, according to the present invention.

FIG. 2 shows the diverter 34 connected between the exhaust pipes 35a and 35b to divert the OGV exhaust flow to the parallel-flow flexible ducts 22 and on to the connection port 31. The diverters 34 thus intercepts the OGV exhaust gas and redirects the OGV exhaust gas from the exhaust pipes 16 to the accessible location 11 which is connected to the emissions treatment system 19 when the OGV is hotelling.

Figure 3A:
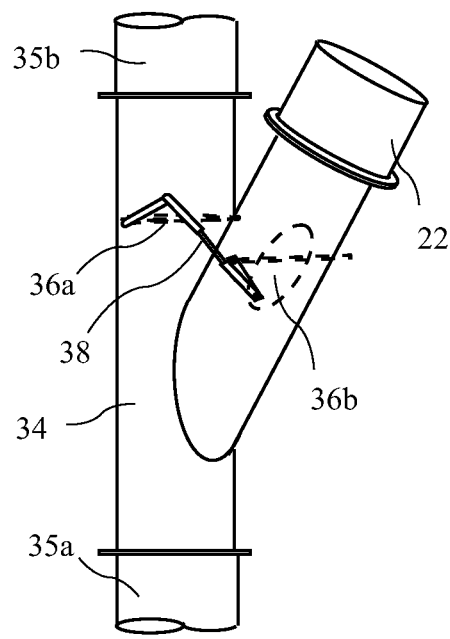
FIG. 3A shows a diverter positioned to divert exhaust gases to an emissions treatment system according to the present invention.
Figure 3B:
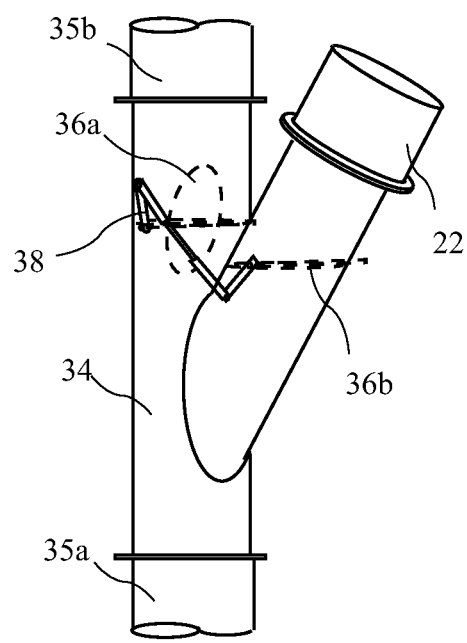
FIG. 3B shows the diverter positioned to pass the exhaust gases to the OGV stack according to the present invention.

FIG. 3A shows the diverter 34 positioned to divert exhaust gases to the emissions treatment system 19. Linkage 38 (see FIG. 4) connects valve 36a in the path to the exhaust pipe 16 to valve 36b in the path to the treatment system 19. The linkage links the valves so that there is always a path for the OGV exhaust through the diverter 34. For example, as the linkage 38 closes one of the valves 36a or 36b, it will necessarily open the other valve 36b or 36a FIG. 3B shows the diverter 34 with the valve 36 open to pass the exhaust gases to the OGV stack 14 and blocking the passage of the OGV exhaust gasses to the emissions treatment system 19.

Figure 4:
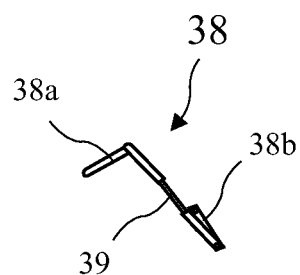
FIG. 4 shows details of diverter linkage according to the present invention.

FIG. 4 shows details of the linkage 38. The linkage 38 includes a first arm 38a connected to the valve 36a and a second arm 38b Examples of suitable emissions treatment systems are described in U.S. Pat. No. 7,258,710 for "Maritime Emissions Control System", U.S. Pat. No. 7,275,366 for "High Thermal Efficiency Selective Catalytic Reduction (SCR) System", and U.S. patent application Ser. No. 11/092,477 for "Air Pollution Control System for Ocean-going Vessels". The '366 patent and '477 application are herein incorporated by reference in their entirety and the '710 was incorporated above by reference.

The diverter valves, parallel flow ducts, collection manifold, and connection socket diverter valves, parallel flow ducts, and collection manifold were described residing mainly inside the OGV 12. While this is a preferred embodiment, retrofitting existing OGVs 12 with the exhaust collection system 10 may be difficult and/or expensive, and the diverter valves, parallel flow ducts, collection manifold, and connection socket may also be installed at the top of the stack 14 rather than internally in the OGV 12.

While the invention herein disclosed has been described by means of specific embodiments and applications thereof, numerous modifications and variations could be made thereto by those skilled in the art without departing from the scope of the invention set forth in the claims.

We claim:

1. An Ocean Going Vessel (OGV) exhaust gas collection system comprising:
    a plurality of OGV exhaust gas sources residing in the OGV;
    a plurality of primary exhaust pipes carrying the OGV exhaust from the OGV exhaust gas sources;
    a plurality of diverters in fluid communication with the primary exhaust pipes and receiving the OGV exhaust from the primary exhaust pipes;
    a plurality of secondary exhaust pipes in fluid communication with the diverters and carrying the OGV exhaust from the diverters to a stack for unprocessed release into the atmosphere;
    a plurality of parallel-flow exhaust pipes in fluid communication with the diverters to receive the OGV exhaust;
    the diverters including diverter valves distributing the OGV exhaust between the secondary exhaust pipes and the parallel-flow exhaust pipes;

a manifold (20) in fluid communication with the parallel-flow pipes to receive the OGV exhaust from the parallel-flow pipes;
a main duct in fluid communication with the manifold to receive the OGV exhaust from the manifold;
a connection port in fluid communication with the main duct to receive the OGV exhaust from the main duct;
a connection duct (24) connectable to the connection port to receive the OGV exhaust from the connection port; and
an emissions treatment system connected to the connection duct and receiving the exhaust flows from the OGV for processing the exhaust flows to reduce release of pollution in the OGV exhaust to the atmosphere.

2. The OGV exhaust gas collection system of claim 1, further including a pressure control system to control the pressure within the OGV exhaust gas collection, the pressure control system comprising:
 a pressure sensor; and
 a fan controlled by the pressure sensor and configured to draw the OGV exhaust gas from the OGV exhaust gas collection system.

3. The OGV exhaust gas collection system of claim 2, wherein the fan resides in the emissions treatment system.

4. The OGV exhaust gas collection system of claim 2, wherein the fan is a variable speed fan.

5. The OGV exhaust gas collection system of claim 3, wherein the pressure sensor (21) is in the manifold (20).

6. The OGV exhaust gas collection system of claim 1, wherein the emissions treatment system resides on a platform selected from the group consisting of a shore-based platform, a water-based platform, and on the OGV itself.

7. The OGV exhaust gas collection system of claim 1, wherein the connection duct has sufficient flexibility to accommodate OGV motions due to wind, tides, and cargo loading and unloading while maintaining connection to the connection port.

8. The OGV exhaust gas collection system of claim 1, wherein the exhaust gas collection system is permanently installed in the OGV and the connection port permanently installed on the OGV hull above the water line allowing a plug-in connection of the connection duct to the connection port to convey the OGV exhaust gases to the emissions treatment system.

9. The OGV exhaust gas collection system of claim 1, wherein the manifold serves as a pressure/vacuum control chamber, wherein the interior of the manifold comprises a plenum providing mechanical compliance to smooth out pressure excursions which could otherwise occur when flows from the OGV exhaust pipes change, the manifold including:
 a pressure sensor providing a feedback control signal for a remote fan, adjusting the fan speed to maintain a slight vacuum within the manifold regardless of exhaust flow.

10. The OGV exhaust gas collection system of claim 1, further including adjustable valves to adjust and balance the flow from the OGV exhaust pipes, the adjustable valves residing in one of the primary exhaust pipes, the diverters, and the parallel pipes.

11. An Ocean Going Vessel (OGV) exhaust gas collection system comprising:
 a plurality of OGV exhaust gas sources residing in the OGV;
 a plurality of exhaust pipes carrying the OGV exhaust from the OGV exhaust gas sources;
 a plurality of diverters in fluid communication with the primary exhaust pipes and receiving the OGV exhaust from the primary exhaust pipes;
 a plurality of secondary exhaust pipes in fluid communication with the diverters and carrying the OGV exhaust from the diverters to a stack for unprocessed release into the atmosphere;
 a plurality of parallel-flow exhaust pipes in fluid communication with the diverters to receive the OGV exhaust;
 the diverters including valves distributing the OGV exhaust between the secondary exhaust pipes and the parallel-flow exhaust pipes, the diverter valves automatically open a first flow to the secondary exhaust pipe while simultaneously closing a second flow to the parallel-flow exhaust new pipes, and the diverter valves automatically close the first flow to the secondary exhaust pipe while simultaneously opening the second flow to the parallel-flow exhaust new pipes;
 a manifold in fluid communication with the parallel-flow pipes to receive the OGV exhaust from the parallel-flow pipes;
 a main duct in fluid communication with the manifold to receive the OGV exhaust from the manifold;
 a connection port in fluid communication with the main duct to receive the OGV exhaust from the main duct;
 a connection duct connectable to the connection port to receive the OGV exhaust from the connection port;
 an emissions treatment system connected to the connection duct and receiving the exhaust flows from the OGV for processing the exhaust flows to reduce release of pollution in the OGV exhaust to the atmosphere;
 a pressure control system comprising:
  a pressure sensor; and
  a fan controlled by the pressure sensor and configured to draw the OGV exhaust gas from the OGV exhaust gas collection system.

12. An Ocean Going Vessel (OGV) exhaust gas collection system comprising:
 a plurality of OGV exhaust gas sources residing in the OGV;
 a plurality of primary exhaust pipes carrying the OGV exhaust from the OGV exhaust gas sources;
 a plurality of diverters in fluid communication with the primary exhaust pipes and receiving the OGV exhaust from the primary exhaust pipes;
 a plurality of secondary exhaust pipes in fluid communication with the diverters and carrying the OGV exhaust from the diverters to a stack for unprocessed release into the atmosphere;
 a plurality of parallel-flow exhaust pipes in fluid communication with the diverters to receive the OGV exhaust;
 the diverters including diverter valves distributing the OGV exhaust between the secondary exhaust pipes and the parallel-flow exhaust pipes, the diverter valves have a first position directing the OGV exhaust gas to the secondary exhaust pipes and a second position directing the OGV exhaust gas to the parallel-flow exhaust pipes and intermediate positions splitting the OGV exhaust gas between the secondary exhaust pipes and the parallel-flow exhaust pipes;
 a manifold in fluid communication with the parallel-flow pipes to receive the OGV exhaust from the parallel-flow pipes;
 a main duct in fluid communication with the manifold to receive the OGV exhaust from the manifold;
 a connection port in fluid communication with the main duct to receive the OGV exhaust from the main duct;
 a connection duct connectable to the connection port to receive the OGV exhaust from the connection port;

an emissions treatment system connected to the connection duct and receiving the exhaust flows from the OGV for processing the exhaust flows to reduce release of pollution in the OGV exhaust to the atmosphere;

a pressure control system comprising:
   a pressure sensor;
   a fan controlled by the pressure sensor and configured to draw the OGV exhaust gas from the OGV exhaust gas collection system; and adjustable valves to adjust and balance the flow from the OGV exhaust pipes, the adjustable valves residing in one of the primary exhaust pipes, the diverters, and the parallel pipes.

13. The OGV exhaust gas collection system of claim 1, wherein the diverter valves have a first position directing the OGV exhaust gas to the secondary exhaust pipes and a second position directing the OGV exhaust gas to the parallel-flow exhaust pipes and intermediate positions splitting the OGV exhaust gas between the secondary exhaust pipes and the parallel-flow exhaust pipes.

14. The OGV exhaust gas collection system of claim 1, wherein:
   the diverter valves automatically open a first flow to the secondary exhaust pipe while simultaneously closing a second flow to the parallel-flow exhaust new pipes; and
   the diverter valves automatically close the first flow to the secondary exhaust pipe while simultaneously opening the second flow to the parallel-flow exhaust new pipes.

15. The OGV exhaust gas collection system of claim 1, wherein the diverter valves comprise pairs of valves, one valve controlling a first flow of the OGV exhaust gas from one of the diverters into a corresponding one of the secondary exhaust pipes and a second valve controlling a second flow of the OGV exhaust gas from the one of the diverters into a corresponding one of the parallel-flow pipes, the pair of valves controlled to continuously provide passage of the OGV exhaust gas from the diverters and allow continuous operation of the OGV exhaust gas sources.

16. The OGV exhaust gas collection system of claim 15, wherein the pairs of valves are mechanically linked to provide passage of the OGV exhaust gas from the diverters to the secondary exhaust pipes and the parallel-flow exhaust pipes.

17. The OGV exhaust gas collection system of claim 1, wherein the primary exhaust pipes are not connected to the OGV main engines and the OGV exhaust gas is not from the OGV main engines.

18. The OGV exhaust gas collection system of claim 1, wherein OGV exhaust gas sources consists essentially of auxiliary engine exhaust gas and auxiliary boiler exhaust gas.

19. The OGV exhaust gas collection system of claim 1, wherein the connection duct and the emissions treatment system are based on land or on a separate vessel.

20. The OGV exhaust gas collection system of claim 1, further including a pressure control system to control the pressure within the OGV exhaust gas collection, the pressure control system comprising:
   a pressure sensor; and
   a pressure relief valve in the manifold releasing OGV exhaust gas from the manifold to reduce pressure in the manifold.

* * * * *